United States Patent
Othmer

(10) Patent No.: US 7,430,724 B2
(45) Date of Patent: Sep. 30, 2008

(54) SYSTEMS AND METHODS FOR DISPLAYING CONTENT IN A TICKER

(75) Inventor: Konstantin Othmer, Mountain View, CA (US)

(73) Assignee: Core Mobility, Inc., Mountain View, CA (US)

( * ) Notice: Subject to any disclaimer, the term of this patent is extended or adjusted under 35 U.S.C. 154(b) by 56 days.

(21) Appl. No.: 10/946,254

(22) Filed: Sep. 20, 2004

(65) Prior Publication Data

US 2005/0039136 A1    Feb. 17, 2005

Related U.S. Application Data

(63) Continuation-in-part of application No. 10/929,000, filed on Aug. 26, 2004, which is a continuation-in-part of application No. 10/917,200, filed on Aug. 11, 2004, and a continuation-in-part of application No. 10/916,960, filed on Aug. 11, 2004.

(60) Provisional application No. 60/494,644, filed on Aug. 11, 2003.

(51) Int. Cl.
G06F 3/00    (2006.01)
G06F 3/14    (2006.01)

(52) U.S. Cl. .................. 715/774; 715/781; 715/765; 709/219

(58) Field of Classification Search ............ 715/733, 715/738, 740, 744–749, 764, 774, 781, 784, 715/786, 789, 866, 501.1, 526, 528, 529, 715/542, 765; 709/201, 203, 204, 217–219
See application file for complete search history.

(56) References Cited

U.S. PATENT DOCUMENTS 3,824,597 A    7/1974    Berg 5,321,750 A    *    6/1994    Nadan .................. 380/230

(Continued)

FOREIGN PATENT DOCUMENTS

EP    1195949 A2    10/2002

(Continued)

OTHER PUBLICATIONS

S. Kinoshita et al, "RealPush Network: A New Push-Type Content Delivery System Using Reliable Multicast and Flexible Browser", 1998, IEEE, pp. 188-189.*

(Continued)

*Primary Examiner*—X. L. Bautista
(74) *Attorney, Agent, or Firm*—Workman Nydegger

(57) ABSTRACT

The timing, order, frequency or presentation attributes of content items in a ticker of a communication device are selected or determined using a scheduling system of the ticker. The location of the communication device is one of many attributes that may be used in a scoring algorithm employed by the scheduling system to determine when and how received content is displayed in the ticker. Based on the attributes that are considered by the scheduling system, ticker content is displayed on the ticker. Communication devices that can use the tickers include personal computers, set top boxes, televisions, landline telephones, cellular telephones, personal digital assistants, laptop computers and any other device that has a display device and is suitably equipped to establish communication with a network.

18 Claims, 7 Drawing Sheets

U.S. PATENT DOCUMENTS

| | | | |
|---|---|---|---|
| 5,875,232 | A | 2/1999 | Wolf |
| 5,875,240 | A | 2/1999 | Silverman |
| 5,959,621 | A | 9/1999 | Nawaz et al. |
| 6,016,307 | A | 1/2000 | Kaplan et al. |
| 6,028,842 | A | 2/2000 | Chapman et al. |
| 6,069,648 | A | 5/2000 | Suso et al. |
| 6,085,148 | A * | 7/2000 | Jamison et al. ............ 701/211 |
| 6,091,956 | A | 7/2000 | Hollenberg |
| 6,138,162 | A | 10/2000 | Pistriotto et al. |
| 6,144,641 | A | 11/2000 | Kaplan et al. |
| 6,151,030 | A | 11/2000 | DeLeeuw et al. |
| 6,157,614 | A | 12/2000 | Pasternak et al. |
| 6,157,935 | A | 12/2000 | Tran et al. |
| 6,173,311 | B1 | 1/2001 | Hassett et al. |
| 6,181,780 | B1 | 1/2001 | Finnigan |
| 6,216,006 | B1 | 4/2001 | Scholefield et al. |
| 6,219,341 | B1 | 4/2001 | Varanasi |
| 6,240,361 | B1 | 5/2001 | Ise et al. |
| 6,285,658 | B1 | 9/2001 | Packer |
| 6,292,799 | B1 | 9/2001 | Peek et al. |
| 6,300,875 | B1 | 10/2001 | Schafer |
| 6,310,889 | B1 | 10/2001 | Parsons et al. |
| 6,324,184 | B1 | 11/2001 | Hou et al. |
| 6,324,271 | B1 | 11/2001 | Sawyer et al. |
| 6,385,449 | B2 | 5/2002 | Eriksson et al. |
| 6,397,059 | B1 | 5/2002 | Vance et al. |
| 6,401,238 | B1 | 6/2002 | Brown et al. |
| 6,421,694 | B1 * | 7/2002 | Nawaz et al. ............... 715/526 |
| 6,453,351 | B1 | 9/2002 | Endo |
| 6,456,594 | B1 | 9/2002 | Kaplan et al. |
| 6,466,202 | B1 | 10/2002 | Suso et al. |
| 6,473,404 | B1 | 10/2002 | Kaplan et al. |
| 6,477,707 | B1 | 11/2002 | King et al. |
| 6,522,875 | B1 * | 2/2003 | Dowling et al. .......... 455/414.3 |
| 6,526,275 | B1 | 2/2003 | Calvert |
| 6,536,041 | B1 * | 3/2003 | Knudson et al. ............... 725/39 |
| 6,538,880 | B1 | 3/2003 | Kamijo et al. |
| 6,542,721 | B2 | 4/2003 | Boesen |
| 6,594,483 | B2 * | 7/2003 | Nykanen et al. ............ 455/411 |
| 6,640,239 | B1 | 10/2003 | Gidwani |
| 6,668,353 | B1 * | 12/2003 | Yurkovic ................. 715/501.1 |
| 6,675,350 | B1 * | 1/2004 | Abrams et al. ........... 715/501.1 |
| 6,727,930 | B2 | 4/2004 | Currans et al. |
| 6,731,238 | B2 * | 5/2004 | Johnson ................. 342/357.09 |
| 6,742,042 | B1 * | 5/2004 | Holden et al. ............... 709/230 |
| 6,757,718 | B1 | 6/2004 | Halverson et al. |
| 6,771,290 | B1 | 8/2004 | Hoyle |
| 6,788,314 | B1 * | 9/2004 | Freiberger et al. |
| 6,966,028 | B1 * | 11/2005 | Beebe ......................... 715/517 |
| 7,013,149 | B2 | 3/2006 | Vetro et al. |
| 7,039,684 | B2 | 5/2006 | Blockton et al. |
| 7,167,728 | B1 | 1/2007 | Wagner et al. |
| 7,177,859 | B2 | 2/2007 | Pather et al. |
| 2001/0013068 | A1 * | 8/2001 | Klemets et al. |
| 2001/0051998 | A1 | 12/2001 | Henderson |
| 2001/0056443 | A1 | 12/2001 | Takayama et al. |
| 2002/0004755 | A1 | 1/2002 | Balthaser |
| 2002/0046104 | A1 | 4/2002 | Kaddeche et al. |
| 2002/0094826 | A1 | 7/2002 | Lee |
| 2002/0103781 | A1 * | 8/2002 | Mori et al. ...................... 707/1 |
| 2002/0145666 | A1 | 10/2002 | Scaman et al. |
| 2002/0151313 | A1 | 10/2002 | Stead |
| 2002/0163938 | A1 | 11/2002 | Tuumainen et al. |
| 2002/0164977 | A1 | 11/2002 | Link, II et al. |
| 2002/0171691 | A1 * | 11/2002 | Currans et al. |
| 2002/0193095 | A1 | 12/2002 | Hutcheson et al. |
| 2002/0194049 | A1 * | 12/2002 | Boyd |
| 2002/0194601 | A1 | 12/2002 | Perkes et al. |
| 2003/0003929 | A1 | 1/2003 | Himmel et al. |
| 2003/0026231 | A1 | 2/2003 | Lazaridis et al. |
| 2003/0032404 | A1 * | 2/2003 | Wager et al. |
| 2003/0045245 | A1 | 3/2003 | Hikishima |
| 2003/0063128 | A1 * | 4/2003 | Salmimaa et al. |
| 2003/0069693 | A1 * | 4/2003 | Snapp et al. ................. 701/213 |
| 2003/0093495 | A1 | 5/2003 | McNulty et al. |
| 2003/0135582 | A1 | 7/2003 | Allen et al. |
| 2003/0142129 | A1 | 7/2003 | Kleven et al. |
| 2003/0164779 | A1 * | 9/2003 | Gieseke et al. ............... 340/993 |
| 2003/0164862 | A1 | 9/2003 | Cadiz et al. |
| 2003/0167467 | A1 | 9/2003 | Allen et al. |
| 2003/0171985 | A1 * | 9/2003 | Prabhu et al. .................. 705/14 |
| 2003/0181228 | A1 | 9/2003 | Kim |
| 2003/0189557 | A1 | 10/2003 | Takagi et al. |
| 2003/0220835 | A1 | 11/2003 | Barnes, Jr. |
| 2003/0220866 | A1 | 11/2003 | Pisaris-Henderson et al. |
| 2003/0226152 | A1 * | 12/2003 | Billmaier et al. |
| 2004/0003402 | A1 * | 1/2004 | McKenna, Jr. ................ 725/46 |
| 2004/0031061 | A1 | 2/2004 | McCalla et al. |
| 2004/0059826 | A1 | 3/2004 | Gould et al. |
| 2004/0067769 | A1 | 4/2004 | King et al. |
| 2004/0073924 | A1 | 4/2004 | Pendakur |
| 2004/0078104 | A1 | 4/2004 | Nguyen et al. |
| 2004/0078814 | A1 | 4/2004 | Allen |
| 2004/0093563 | A1 | 5/2004 | Pasquali |
| 2004/0101274 | A1 | 5/2004 | Foisy et al. |
| 2004/0107439 | A1 | 6/2004 | Hassell et al. |
| 2004/0116167 | A1 | 6/2004 | Okuzako et al. |
| 2004/0133655 | A1 | 7/2004 | Yen et al. |
| 2004/0143636 | A1 | 7/2004 | Horvitz et al. |
| 2004/0186733 | A1 | 9/2004 | Loomis |
| 2004/0192336 | A1 | 9/2004 | Walby |
| 2004/0196265 | A1 | 10/2004 | Nohr |
| 2004/0203512 | A1 | 10/2004 | Ho et al. |
| 2004/0203851 | A1 | 10/2004 | Vetro et al. |
| 2004/0204122 | A1 | 10/2004 | Opela et al. |
| 2004/0205065 | A1 | 10/2004 | Petras et al. |
| 2004/0210947 | A1 | 10/2004 | Shushman |
| 2004/0233160 | A1 | 11/2004 | Chincholle et al. |
| 2005/0005242 | A1 | 1/2005 | Hoyle |
| 2005/0022114 | A1 | 1/2005 | Shanahan et al. |
| 2005/0032527 | A1 | 2/2005 | Sheha et al. |
| 2005/0039135 | A1 | 2/2005 | Othmer et al. |
| 2005/0039136 | A1 | 2/2005 | Othmer et al. |
| 2005/0125375 | A1 * | 6/2005 | Lee et al. |
| 2005/0136949 | A1 | 6/2005 | Barnes, Jr. |
| 2005/0140504 | A1 | 6/2005 | Marshall et al. |
| 2005/0144065 | A1 | 6/2005 | Calabria et al. |
| 2006/0010476 | A1 | 1/2006 | Kelly et al. |
| 2006/0022048 | A1 | 2/2006 | Johnson |
| 2006/0126556 | A1 | 6/2006 | Jiang et al. |
| 2006/0133307 | A1 | 6/2006 | Fukasawa et al. |
| 2006/0159096 | A1 | 7/2006 | Gershinsky et al. |
| 2006/0179415 | A1 | 8/2006 | Cadiz et al. |
| 2006/0217110 | A1 | 9/2006 | Othmer |
| 2006/0219780 | A1 | 10/2006 | Swartz et al. |
| 2006/0229065 | A1 * | 10/2006 | Lazaridis et al. |

FOREIGN PATENT DOCUMENTS

JP  409311997 A1  12/1997

OTHER PUBLICATIONS

NTT, "NTT Develops RealPush Network", Dec. 19, 1997, News Release, 3 pages.*
U.S. Appl. No. 11/061,422, filed Feb. 18, 2005, Othmer.
U.S. Appl. No. 11/128,649, filed May 13, 2005, Othmer.
U.S. Appl. No. 11/298,818, filed Dec. 9, 2005, Othmer.
U.S. Appl. No. 11/426,294, filed Jun. 23, 2006, Othmer et al.
U.S. Appl. No. 11/426,295, filed Jun. 23, 2006, Othmer et al.
A. Catovic et al, "Geolocation updating schemes for location aware services in wireless networks", 2001, IEEE, vol. 1, pp. 378-382.
G. Bieber et al, "XyberScout: a platform for the efficient construction of mobile location aware information systems", Jan. 2003, IEEE.

"SCE Stuents' Applications Won Motorola's Buddy Finder Competition", http://www.ntu.edu.sg/sce/achieves-sch2003-05.asp#2003-11-3;2003.
U.S. Appl. No. 10/916,960, filed Aug. 11, 2004, Othmer et al.
U.S. Appl. No. 10/917,200, filed Aug. 11, 2004, Othmer et al.
Notice of Allowance mailed Jul. 12, 2007 for U.S. Appl. 10/929,000.
Office Action mailed Jul. 27, 2007 for U.S. Appl. 10/916,960.
Office Action mailed Mar. 22, 2007 for U.S. Appl. 10/916,960.
Office Action mailed Dec. 14, 2006 for U.S. Appl. 10/916,960.
Office Action mailed Mar. 14, 2006 for U.S. Appl. 10/916,960.
Office Action mailed Mar. 22, 2007 for U.S. Appl. 10/929,000.
Office Action mailed Dec. 19, 2006 for U.S. Appl. 10/929,000.
Office Action mailed Mar. 24, 2006 for U.S. Appl. 10/929,000.
Office Action mailed Jul. 5, 2007 for U.S. Appl. 10/128,649.
Office Action mailed Jun. 28, 2006 for U.S. Appl. 11/061,422.
Office Action mailed Nov. 1, 2006 for U.S. Appl. 11/061,422.
Office Action mailed Aug. 22, 2007 for U.S. Appl. 10/061,422.
Office Action mailed Mar. 30, 2007 for U.S. Appl. 10/061,422.
Office Action mailed Sep. 4, 2007 for U.S. Appl. 11/298,818.
Office Action mailed Apr. 19, 2007 for U.S. Appl. 11/298,818.
Office Action mailed Sep. 19, 2007 for U.S. Appl. 10/426,295.
U.S. App. No. 10/916,960, Oct. 29, 2007, Office Action.
U.S. App. No. 10/929,000, Oct. 31, 2007, Office Action.
U.S. App. No. 11/090,724, Jan. 11, 2007, Office Action.
U.S. App. No. 11/090,724, Apr. 30, 2007, Office Action.
U.S. App. No. 11/090,724, Oct. 3, 2007, Office Action.
U.S. App. No. 11/426,294, Nov. 19, 2007, Office Action.
U.S. App. No. 10/916,960, Nov. 28, 2007, Office Action.
U.S. App. No. 11/298,818, Nov. 29, 2007, Notice of Allowance.
U.S. App. No. 11/061,422, Dec. 27, 2007, Notice of Allowance.
U.S. App. No. 11/128,649, Dec. 28, 2007, Office Action.
U.S. App. No. 11/426,295, Apr. 10, 2008, Office Action.
U.S. App. No. 11/090,724, Jun. 27, 2008, Office Action.

* cited by examiner

US 7,430,724 B2

SYSTEMS AND METHODS FOR DISPLAYING CONTENT IN A TICKER

RELATED APPLICATIONS

This application is a continuation-in-part of U.S. patent application Ser. No. 10/929,000, filed Aug. 26, 2004. U.S. patent application Ser. No. 10/929,000, filed Aug. 26, 2004, is a continuation-in-part of U.S. patent application Ser. No. 10/917,200, filed Aug. 11, 2004, and is a continuation-in-part of U.S. patent application Ser. No. 10/916,960, filed Aug. 11, 2004, both of which claim the benefit of U.S. Provisional Patent Application Ser. No. 60/494,644, filed Aug. 11, 2003. The foregoing patent applications are incorporated herein by reference.

BACKGROUND OF THE INVENTION

1. Field of the Invention

The present invention relates generally to communications systems, methods and devices. More particularly, exemplary embodiments of the invention concern systems and methods directed to receiving and displaying content in a ticker on a communication device.

2. Related Technology

The popularity of the Internet has given rise to a plethora of information services as consumers have become accustomed to accessing timely, personalized news and information. As a result, demand for these types of content services continues to grow. Scrolling information displays, referred to herein as "tickers," are one type of content distribution mechanism that can give a viewer a quick, high-level update, and they have become commonplace on the television news and on sports channels, providing viewers with "at-a-glance" headlines, breaking news, weather reports, sports scores and other updates.

One early example of a scrolling information display or "ticker" on a personal computer (PC) system was that provided by Pointcast. Through the Pointcast service, PC users could subscribe to news and information channels of interest and receive periodic updates on their computer displays, often in the form of a scrolling information display at the bottom of the user's display screen—commonly known as a ticker. An even earlier example of the use of tickers in conjunction with a PC was the ticker provided by gaming company Catapult Entertainment, Inc. The Catapult ticker, in addition to providing information to users of the gaming system about news and current events and gaming-related information such as upcoming tournaments, high scores, and new software releases, was also interactive through the use of the computer mouse. Rather than being limited to the information in the ticker, the user could click on an item in the ticker having a Universal Resource Identifier (URI) associated with it, which would then cause a web page to be displayed with additional information about that item. More recently, through the use of messaging systems with near-universal reach such as the Short Messaging System (SMS), mobile workers can now receive up-to-the-minute business, financial and customer information on their mobile devices from various news and entertainment content providers and from many other information sources, including corporate portals and customer relationship management applications. Furthermore, tickers are beginning to appear as a method for dynamic information display on mobile communication devices, such as cellular telephones, personal digital assistants (PDAs), and "smart" phones.

While the value of receiving personalized, timely information in a condensed, quickly-read format such as a ticker is indisputable, the information tickers known in the art could be significantly improved. Since it is likely that content from many different sources will be received by and displayed in a ticker on a communication device, it would be valuable both to the communication device user and to the content provider to display content in the ticker at a time, in an order, with a frequency and with presentation attributes that reflect the characteristics of the content, such as its source, the time sensitivity and priority of the content, any applicable advertising and marketing agreements associated with the content, and the preferences of the communication device user. Such a ticker content scheduling system is described in the following disclosure.

BRIEF SUMMARY OF AN EXEMPLARY EMBODIMENT OF THE INVENTION

In general, exemplary embodiments of the invention concern systems and methods for determining the timing, order, frequency and presentation attributes of content to be displayed in a ticker on the display screen of a communication device, and then displaying the content in accordance with the determination. The term "communication device" as used herein refers to personal computers, set top boxes, cellular telephones, personal digital assistants (PDAs), watches, and any other communication devices having a display device and enabled to receive data. The term "ticker" refers to a portion of a display screen on a communication device in which information is dynamically displayed. The ticker should not be construed to be limited to the commonly-known scrolling information display that often appears at the at bottom of a display screen, rather, the ticker can take many shapes and forms, and the location of the ticker on the display screen as well as many other ticker characteristics can be customized to suit the needs and preferences of the user. Content that is received by the communication device and displayed in the ticker may also be referred to herein as "ticker item(s)".

More specifically, embodiments of the invention provide for receiving content on a communication device. The content is presented to the user in a ticker on the display of the communication device. Content received into the ticker of the communication device can include many different types of media, such as text, audio, and video that is transmitted to the communication device over a network, as well as content that is received by the ticker from local applications resident on the communication device. Received content is displayed according to a scheduling system that considers factors such as the characteristics of the content, user preferences and the location of the communication device. One such way of implementing this is by assigning a score to the content. The score determines when, how, and how often the content is displayed in the ticker.

In the exemplary embodiment, a user has a mobile communication device that is suitably equipped to receive data using for example, a cellular network, the short message service (SMS), the 802.11 family of wireless local area networks (WLAN), a Bluetooth network, satellite and terrestrial broadcast networks or any other type of network, combination of networks, or network connections to which the mobile communication device can connect and receive data transmissions. These data transmission modes are also referred to herein as "bearers". While a mobile device is referred to in the exemplary embodiment, the methods of the invention should not be construed to be limited to mobile communication devices.

Returning to the exemplary embodiment, the mobile communication device is also equipped with ticker client software that enables a ticker to be rendered on the display of the mobile communication device. The ticker client software may further communicate with a ticker server to receive content that has been aggregated from multiple content providers and is then provided to the ticker on the communication device based on certain considerations. The user may have a relationship with one or more content providers from which content is received into the ticker of the communication device, and the content may also be transmitted to the user's communication device without the user having subscribed to any particular service or formed a relationship with a content provider. In some cases the user may express preferences for certain types of content that may then be received by the ticker client software and displayed in the ticker. In other cases the user may choose to block certain types of content.

Based on any of a number of considerations such as available network connections, the location of the mobile communication device, user preferences, content display rules, or any combination of these, the ticker on the communication device periodically receives content. Moreover, based on other considerations such as the capabilities of the communication device, the traffic load on a particular network, and the size, type and priority of the data transmission intended for the ticker of the communication device, one bearer may be selected instead of another to utilize the available network resources optimally and transmit content to the ticker of the communication device in a way that is cost efficient and may conserve bandwidth. Furthermore, any of a number of content delivery mechanisms that operate in conjunction with a bearer may be used to deliver content to the ticker, including multimedia messaging service (MMS), really simple syndication (RSS), email, and many other content delivery mechanisms.

Once the content is received by the ticker client software on the communication device, a scheduling system of the ticker client software determines the time at which the content will be displayed in the ticker, the order in which it will be displayed relative to other content in the ticker, the frequency with which the content should appear in the ticker, and the presentation attributes that should be applied to affect the appearance of the content displayed.

In one example, a cellular telephone user subscribes to a ticker service of the invention and indicates preferences for categories of content by inputting the preference via a user interface element on the cell phone. In this case, the user could specify, for example, a preference for Peet's coffee and indicate a desire to be notified about special promotional offers and also to receive an alert each time a Peet's coffee store is nearby. The preferences are then stored for future reference by the system. As the user changes location throughout the day, the cell phone reports its geographical location or the cell phone location is otherwise communicated periodically to a ticker server of the ticker service, and from time to time the ticker on the user's cell phone receives content updates, including location-aware content and other content, which is then displayed on the ticker to the user. Alternatively, the ticker server can send a list of Peet's coffee shop locations along with a promotional message for display within the ticker, and store it on the cell phone for display at a later time. Display rules including triggers, such as time and location, that when activated may cause the content to be displayed in the ticker may be received in metadata associated with the content and stored on the cell phone. Other rules may include an expiration time for a promotion or a rule concerning the frequency with which content should be displayed in a ticker. These rules, among other considerations, are then considered by the scheduling system as it determines when and how the message from Peet's should be displayed in the ticker. For example, based on the user's proximity to a Peet's location, a message could appear within the ticker that says "Peet's coffee 2 blocks west". Determining a mobile device's location is well understood in the art and can be done through a number of means including GPS, assisted GPS, or RF triangulation. In this example, the ticker scheduling system (described in more detail herein) considers information such as the user's preferences, and the device location in proximity to a Peet's location to determine what, when and how information should be displayed on the ticker.

Member vendors of the ticker service may register information about their products and services, including advertisements, promotional information and entertainment-related information with the ticker service. In this example, Peet's Coffee, a member vendor of the ticker service, could register a promotional coupon with the service, which is then transmitted to communication devices located, for instance, in a particular region such as Northern California. The promotional coupon may be associated with metadata that can include any of a number of rules pertaining to when and how the coupon should be displayed within the ticker, and in this case includes a proximity rule stating that if a user arrives at a location within a specified distance of a Peet's retail store, the information is to be displayed on the ticker of the user's device. The Peet's promotional content may be downloaded at any time, such as during an off-peak time for network traffic, regardless of the user's current location, and stored on the device, pending the decision of the scheduling system when the user reaches the location specified in the proximity rule, and ultimately, display of the content within the ticker.

Alternatively, the Peet's promotional information may be stored at the ticker server, and then downloaded to the data store on the device in "real-time" or near real-time when the user reaches the specified location. In this case, when the user's cell phone travels near a Peet's Coffee location, the ticker server, having determined that there is a match between the user's preference for Peet's, the user's current location, and the location of the nearest Peet's, transmits data concerning the nearest Peet's location to the ticker on the user's device. The member vendor may specify one proximity rule for mobile communication device users, and another proximity rule for stationary or wired communication devices. Furthermore, other characteristics of the user's device can be taken into account, such as the speed at which it is moving. The speed and direction of motion of the communication device can be determined through GPS offsets or other methods, included in the geographical information about the communication device, and reported to the ticker server or used to select location-based content already stored locally on the communication device. A third proximity rule can be specified for devices in motion. For example, if the device is moving faster than fifteen miles per hour, the proximity rules may say that the Peet's promotional content should display if the device is within three miles of a Peet's retail location.

According to this example, Peet's has further specified an expiration time after which the coupon should not be transmitted to the communication devices. Similarly, content transmission may also commence based on time, and the time at which content is transmitted to the device may or may not be independent of the device location. In general, the ticker content can be transmitted or displayed at a time or manner specified by a triggering event. Examples of such triggering events include a specified time or location. Upon the occurrence of the triggering event, content that has been designated as being appropriate for the triggering event (e.g., appropriate for the current time or location of the communication device) is displayed on the ticker or transmitted to the communication device.

Returning to the present example, in some cases the Peet's data may be transmitted directly to a communication device without having first been aggregated at the ticker server. For example, if the mobile device encounters a wireless local area network (WLAN), such as an 802.11 network, the Peet's data can be transmitted directly to the mobile device.

After the content is transmitted to the device using any of the aforementioned methods, the transmitted data is indexed in a data store on the device according to its attributes, and a scheduling system is employed to determine when and how the content will be displayed within the ticker on the device. For example, because the user has indicated a strong preference for Peet's coffee, and the user is only fifty yards away from the retail store, the scheduling system, having considered the device location, rules that may have been received in metadata associated with the content, and user preferences, determines that the content should be displayed within the ticker immediately in a red font, and the device could emit an audible tone and/or vibrate to notify the user that actionable content pertaining to an important preference has arrived in the ticker. Other presentation attributes of the content are also possible and may be determined by the scheduling system.

Significantly, content can be obtained from multiple content sources over any number of networks or bearer, depending on the configuration of the device. For example, as the user changes location, a cell phone equipped to communicate with a cellular telephone system and to sense both Bluetooth and 802.11 networks may obtain stock quotes via an SMS text message, art exhibit content via Bluetooth, and a discount coupon from a nearby retailer associated with an 802.11 wireless access point. As noted previously, the source of the content and/or the user's proximity to the source of the content can be variables scheduling algorithm employed by the scheduling system to determine when and how content is displayed in the ticker.

In this manner, the systems and methods of the invention can schedule the display of content within a ticker on a communication device in accordance with a scheduling algorithm that considers one or more variables to determine when and how content is displayed. This represents a significant improvement over conventional ticker systems, which fail to take into account considerations such as the content source, the time sensitivity and priority of the content, the location of the communication device user, applicable advertising and marketing agreements, and the preferences of the communication device user when populating tickers.

These and other aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EMBODIMENTS OF THE INVENTION

Figure 1:
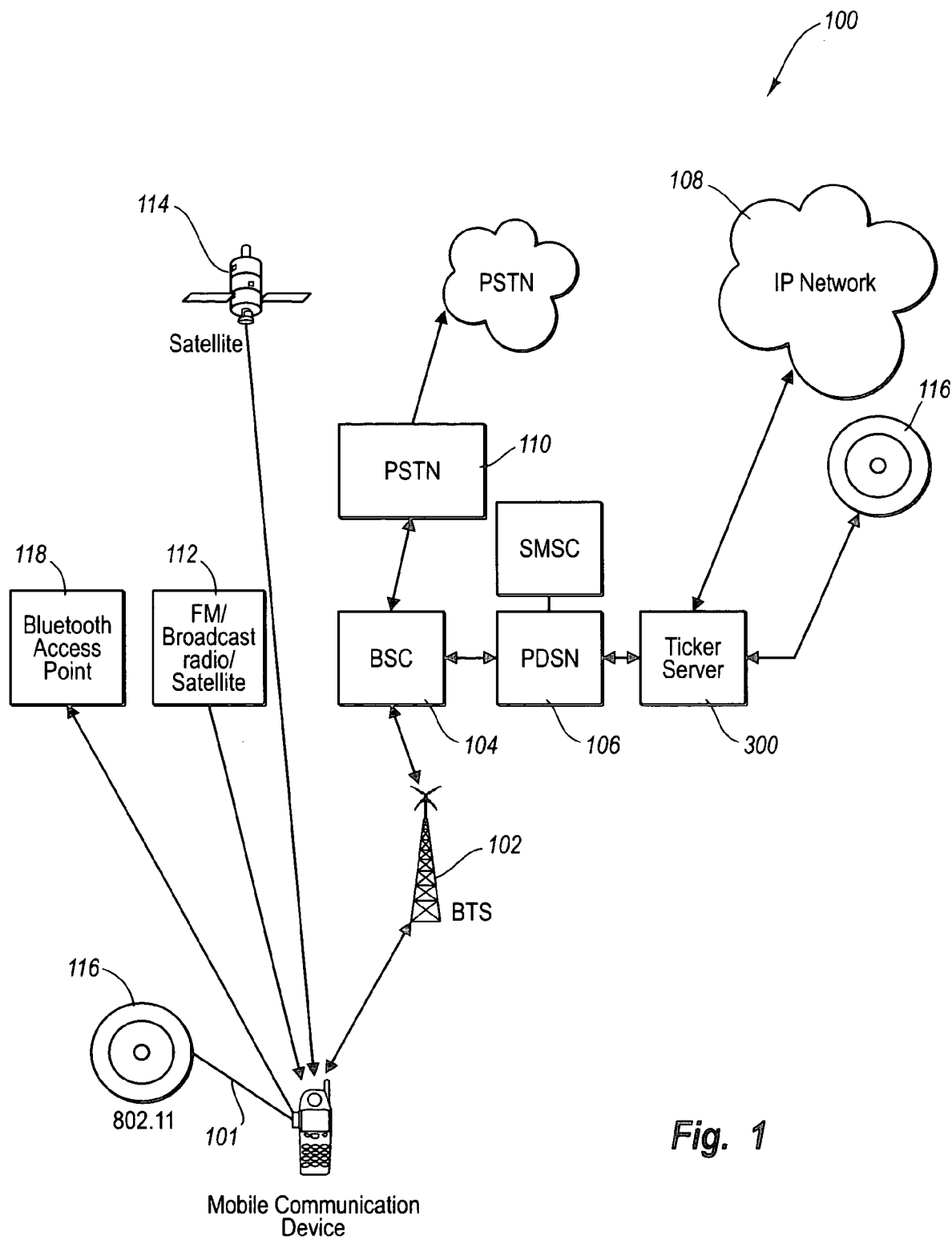
FIG. 1 is a schematic view illustrating aspects of an exemplary operating environment for embodiments of the invention.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with systems and methods for determining the timing, order, frequency and presentation attributes of content displayed in a ticker on the display screen of a communication device. Communication devices that may be employed in conjunction with the invention include PCs, set top boxes, televisions, landline telephones, cellular telephones, PDAs, laptop computers and any other device having a display device or an associated display device and suitably equipped to establish communication with a network. In particular, exemplary embodiments of the invention are directed to the use of mobile communication devices in conjunction with the invention. However, the invention should not be construed to be limited to the use of mobile communication devices, nor should its application be construed to be limited to content that is transmitted and/or displayed on a communication device based on the geographical location of the communication device. The location of the communication device is one of many variables that may be used in the scheduling algorithm employed by the scheduling system of the invention to determine when and how received content is displayed in the ticker.

Embodiments of the invention include content gateways through which some content providers make content available to users of the location-based ticker service. Other content providers, such as product vendors with products and services to advertise, may register with the ticker system and input marketing and advertising campaigns into the system. Methods of the invention allow users to subscribe to the ticker service of the invention, express preferences for certain types of content, and block other types of content. Filters residing on the communication device manage receipt of content on the device in accordance with user preferences. Depending on the metadata and other rules associated with the transmitted advertising, promotions and other content, the content may then be scheduled for display within the ticker on the device. Methods of the invention in an exemplary embodiment provide for a scheduling mechanism that employs a scoring algorithm to, among other things, reconcile the display rules of content competing for display time in the ticker and to determine which content is displayed within the ticker, at what time, in what order, with what frequency and using which presentation attributes. Other scheduling algorithms beyond the scoring algorithm explained herein could be used as well. Furthermore, the manner in which the transmitted content is displayed can include a wide variety of content presentation attributes, including the shape, size, speed and location on the display screen of the ticker, multiple font effects, and audible or tactile notifications indicating that new location-based content has arrived at the ticker. Finally, the methods of the invention provide an accounting system to track and report activities associated with ticker usage.

I. Operating Environments and Associated Devices

With particular attention now to FIG. 1, one exemplary implementation of an operating environment, denoted generally at 100, is indicated. Although this exemplary operating environment comprises multiple types of networks, including a cellular telephone network, 802.11 networks, Bluetooth access points, and broadcast networks such as FM radio or satellite radio, the invention may be employed in connection with any other type of network and associated devices that are effective in implementing or facilitating wireless communication or landline communication. While FIG. 1 depicts a cellular telephone and exemplary embodiments are directed to the use of cellular telephones in conjunction with the invention, the invention should not be construed to be limited to such devices. As previously noted, PCs, set top boxes, televisions, landline telephones, cellular telephones, PDAs, laptop computers and any other device suitably equipped to establish communication with a network and having a display device or associated with a display device may be used to implement the methods of the invention. Accordingly, the scope of the invention should not be construed to be limited to the exemplary operating environment indicated in FIG. 1.

In the exemplary illustrated embodiment, the operating environment 100 includes one or more mobile communication devices 101 configured to communicate with one or more networks and/or network elements, including base transceiver station (BTS) 102 of the cellular network, internet protocol (IP) network 108, FM or satellite radio broadcast network 112, 802.11 networks 116, and Bluetooth access point 118. Mobile communication device 101 may determine its geographical location using positioning techniques known in the art such as a global positioning system (GPS) or wireless-assisted GPS, for which it uses one or more satellites 114. Its location can also be determined by other methods, such as triangulation of the signal from the cell sites serving the mobile device or by simply encountering an 802.11 network or Bluetooth access point, which effectively positions the device. Alternatively, the device location may be determined by querying another server on the network that contains location information about the device. The location of landline devices may be explicitly specified by the device user through submission of an information profile to the location-based ticker service. Mobile communication device 101 is further configured with ticker client software that enables it to render a ticker on the display screen of the communication device, and among other things, to communicate with ticker server 300 that may be embodied, in one implementation, as a server operating in conjunction with IP network 108. Ticker server 300 may further interface with other network elements, such as a Short Message Service Center (SMSC) and various gateways to implement the methods of the invention.

II. Receiving and Displaying Content in the Ticker

Figure 2:
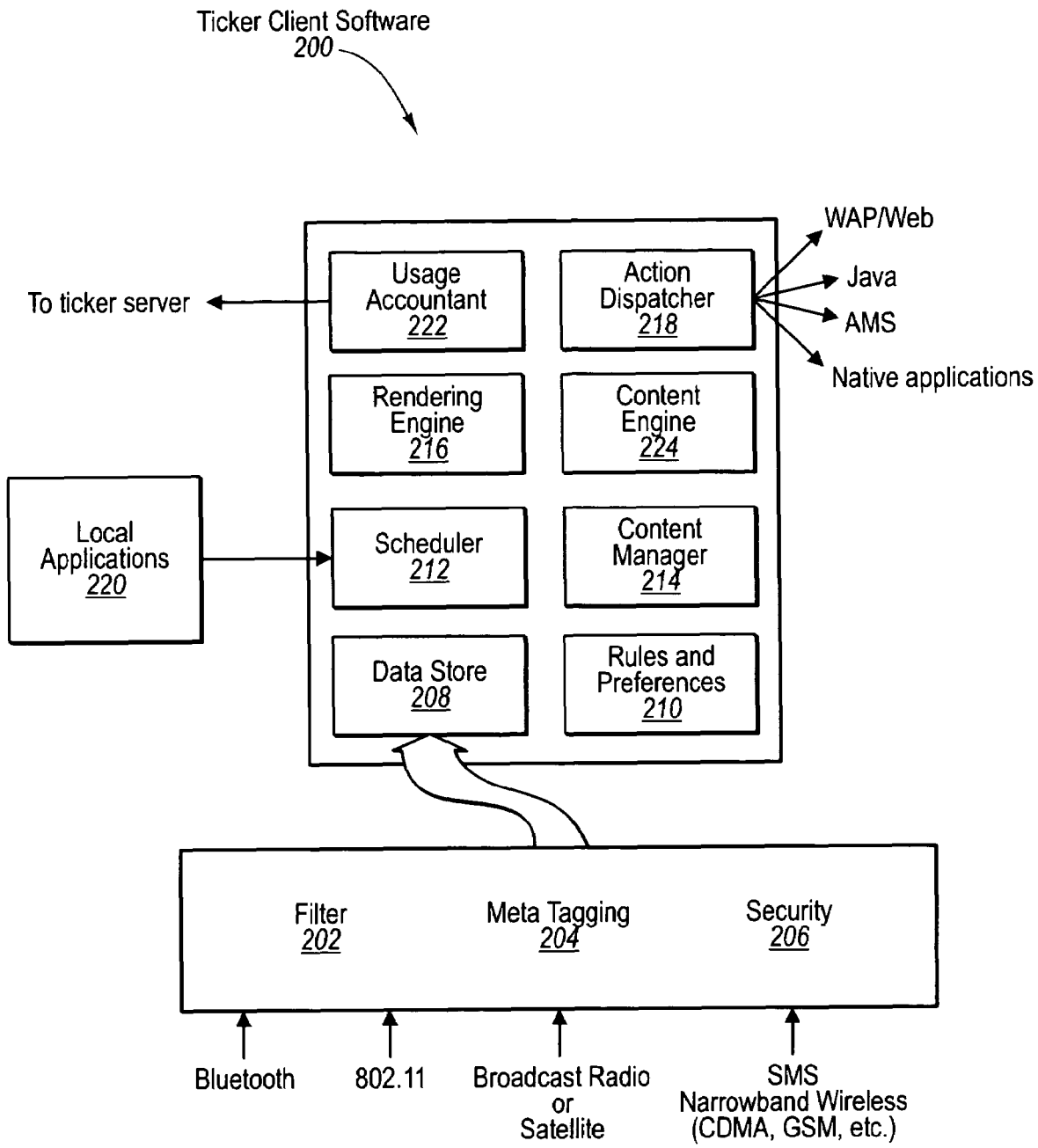
FIG. 2 is a schematic view illustrating aspects of ticker client software.

Directing attention now to FIG. 2, details are provided concerning an example of ticker client software 200. Ticker client software 200 resides on the communication devices used in conjunction with the invention. In the exemplary embodiment, ticker client software 200 is installed on mobile communication device 101, which is suitably equipped to establish a connection with one or more networks and send and receive data. Ticker client software 200 operates in conjunction with a ticker server discussed in more detail below.

Ticker client software may include filter 202, meta tagging mechanism 204 and security system 206. Content can become available to ticker client software 200 operating on mobile communication device 101 from multiple content sources and over various types of network connections or bearers. In one case, content providers may supply content through various gateways to ticker server 300 or content providers may alternatively submit product and service content to the ticker server directly. In either case, the content may then be transmitted to ticker client software 200 using, for example, a data connection over a cellular network, or via a Short Message Service (SMS) message. Alternatively, content can be supplied to ticker client software 200 directly, without having first been aggregated at ticker server 300. For example, a user of mobile communication device 101 enabled with ticker client software 200 and equipped with a Bluetooth chipset may receive content directly when it encounters another Bluetooth device. Bluetooth is a wireless technology typically used for short range communication of data and voice from one device to another, usually within a small area. One example of such an application would be the ability to receive into the ticker a detailed description of an art exhibit being viewed by the user. In this case, the content sent to mobile communication device 101 is both location-based and context-aware, in that the device automatically senses the Bluetooth connection and receives content specific to the context, in this case an art exhibit. In addition to communicating the ticker content directly to the device, it could deliver it via an alternative means such as email. For example, when mobile communication device 101 communicates with the Bluetooth access point, it might provide its email address to the art exhibit system. The system could then send specific content to that email address with special codes indicating that it is to be interpreted by the ticker software on that device. Mobile communication device 101 may further be configured to interact with an 802.11 network, and when it encounters an 802.11 wireless access point it can similarly receive content, including location-based, context-aware content such as a promotional coupon for a nearby restaurant, and then display it in the ticker at 12 p.m. or at another user-specified lunchtime. Ticker client software 200 may also monitor networks such as FM radio and satellite radio and "pick and choose" broadcasted content that is relevant to the user.

Generally, the value of using multiple bearers is that some bearers are better suited to delivering certain types of content than others. In some cases, the ticker system may select a bearer based on the nature of the content itself. For example, a very small data payload that should be delivered in "real-time" or near real-time, such as a local traffic alert, may be delivered using broadcast SMS. Conversely, a data payload that is larger in size and that contains personalized content, such as tourist site information that includes a review of a nearby restaurant and a discount coupon, may be delivered over an IP connection. In other situations, the fastest way to obtain real-time data, such as a baseball score, while using the least amount of communication device overhead may be for the ticker client software to obtain the baseball score from a satellite or terrestrial radio broadcast. Furthermore, highly personalized content, regardless of the size of the transmission, may be more appropriately delivered over a cellular network using a data connection. It should be noted that regardless of the content source or transmission method, the content is typically transmitted to mobile communication device 101 at a time when the device is not otherwise engaged in a communication session to avoid any disruption in communication.

In any case, when content becomes available from a source that is external to ticker client software 200, filter 202 evaluates it to determine if it should be received. Security element 206 further examines the available content to ensure it is from a credible source. If filter 202 decides, based on rules and preferences 210 that the content should be received, and security 206 further endorses receipt of the content, meta tagging module 204 may associate metadata with the content, which describes the attributes of the content being received and could include information about the user's preferences with regard to the content. The metadata added by meta tagging module may be in addition to metadata already associated with the content by the content provider. The content is then received into data store 208 and indexed in data store 208 according to its attributes. The aforementioned rules and preferences 210 are specified by the user upon registration and/or subscription with the ticker service to assist in controlling and managing receipt and display of content within the ticker. Among other things, the user can express preferences for certain types of content or the user may block receipt of certain types of content or content sources. The user can further specify preferences for the form taken by the ticker, such as its shape, size, and location on the display of mobile communication device 101. Rules and preferences 210 can be modified by the user at any time. In addition, the ticker service can modify what is displayed to the user based on a history of ticker items the user has previously interacted with, thus inferring the user's preferences. The history of the ticker activity, the explicit user preferences and rules, and other criteria other than geographic location, are referred to herein collectively as "user criteria," which can be used to filter incoming location-based content and to determine whether and when to display the content on the ticker.

Once received into data store 208, scheduler 212 determines the time at which the content will be displayed relative to all of the content received and scheduled for display within the ticker. In some cases, content may be displayed immediately after its receipt into data store 208, based on the ticker server's knowledge of the device location. In other cases, content is received and stored in data store 208 for a period of time before it is displayed within the ticker. In this case, content engine 224 of ticker client software 200 is responsible for periodically checking the location of the device and then interfacing with data store 208 to search for matches between the current location of the device and available content. In still other cases, the immediacy of an encounter between a WLAN and the mobile communication device causes content to be received and displayed within the ticker. In all of these cases, scheduler 212 is responsible for determining the timing and order in which all of the available content is displayed in the ticker of mobile communication device 101.

In addition to content received from sources external to the mobile communication device 101, local applications 220 operating on the device 101 can also generate data and submit it to scheduler 212 to be scheduled for display within the ticker. For example, a calendar application may send an appointment alert to scheduler 212 for display within the ticker. The scheduler is able to take into account the time sensitivity of the data and schedule its display within the ticker accordingly.

With continuing attention to FIG. 2, content manager 214 interfaces with data store 208 to manage the ticker content. For example, the content manager keeps only the latest score in a sports game and deletes previous versions. It also deletes old or expired content or content that the user has viewed and should be deleted based on rules contained in the metadata. In one example, a news alert about a particular event may be stored and scheduled for display in the ticker at a particular time. If updated content is subsequently received in data store 208, content manager 214 ensures that the most recent news alert is displayed in place of the older content already scheduled for display.

Rendering engine 216 of ticker client software 200 receives input from rules and preferences module 210 concerning the look and feel of the content displayed on mobile communication device 101. For example, the user may want the content to appear in the "traditional" ticker format, wherein it scrolls horizontally across the bottom of the display screen. Alternatively, the user may wish to view the location-based content as a rotating, three-dimensional box, with each face of the box showing a different category of location-based content. The ticker may display special attributes such as transparency, which allows the user to see through the ticker to what is displayed behind it. The user may further specify that certain categories of location-based content be displayed passively within a scrolling, horizontal ticker, whereas other categories of location-based content should be displayed in a more dramatic way, such as with specialized font attributes, in a particular color, and with accompanying animations, such as "entrance" animations.

Presentation effects including contrasting font color, "new" graphics, a change in the order of presented items and audible and tactile alerts may be used to denote new content received. A "free form" ticker could be employed in which new, location-based content "flies" onto the display screen without being contained within the specified ticker format(s). Similarly, content can "fade in" or "fade out" from the display screen, or "builds" may be used in which fragments of content are displayed one after the other, rather than all at the same time, until the complete content is displayed. In one example, rendering engine 216 could be instructed to display a particular local traffic update with an entrance animation that flies across the display screen and flashes. The entrance animation could be further accompanied by an audible or tactile notification, such as a ring tone or device vibration to alert the user of a traffic accident on the user's transportation route. Rendering engine 216 may further implement numerous attributes and effects pertaining to the shape, size, location, scroll speed, font attributes, color schemes and themes of the content displayed in the ticker and of the behavior of individual ticker items or categories of ticker items and render them on the display of mobile communication device 101 accordingly.

III. Ticker Interaction and Use

With continuing reference to FIG. 2, as has been previously noted the ticker of ticker client software 200 may be interactive. Action dispatcher 218 manages user interaction with the ticker and interfaces with the rest of the communication device on which the ticker is hosted in response to user interaction with the ticker. User interaction with a ticker item such as by clicking on the item, scrolling to it, highlighting it or otherwise selecting the item, can cause a secondary action. In one case, the user may employ ticker navigation effects, such as scrolling through the ticker at a faster rate, skipping items, or even deleting ticker items by pressing a single button on the mobile communication device. In one example, a URI associated with the ticker item is launched when the user selects the item, such as by clicking on the item, resulting in display of a web page containing additional content about the item. In another case, as the user approaches his favorite video store, he may receive an advertisement in the ticker announcing the availability of a new movie available for rent. Selection of the advertisement can give the user the option of downloading a java application for example, which is a movie trailer. The user may then wish to send an email or other message to the store to reserve the movie. The action dispatcher 218 interfaces with the appropriate external systems to manage download of the java application and dispatch of the message to the store. Once the movie trailer is downloaded, it can be viewed on the communication device. Another example of ticker use is to conduct a poll or a survey. Users leaving the premiere of a new movie could be presented with a poll in the ticker. Clicking on certain items in the ticker would indicate the user's response to the questions in a poll. Similarly, users could receive a customer satisfaction poll upon leaving a retail store from which they have purchased a product or service. Additionally, selection of the previously mentioned appointment notification displayed in the ticker can cause the calendar application to be launched so the user can view the full details of the impending appointment, and receive driving directions to the appointment based on his current location.

Finally, ticker client software 200 employs usage accountant 222 to monitor and track the ticker items displayed within the ticker and the various ways in which the user interacts with the ticker items. For example, selecting an advertisement for a new restaurant may result in driving directions being displayed in a WAP browser, and the user may further be presented with an option for automatically dialing the restaurant phone number to make a reservation. The usage accountant 222 monitors and reports on the transaction so the advertiser receives feedback about response to the advertisement. In this case, whether or not the user dials the phone number is a very important piece of information for the advertiser. At the same time, the selection of the ad by the user is accounted for so the advertiser of the restaurant can be charged, as with pay-for-performance advertising business models. In addition to monitoring and reporting on transactions that result in billing activity, user interaction with location-based items in the ticker is also aggregated in order to better understand user preferences, supply the user with content which is even more finely tuned over time to meet user needs, and to maximize the effectiveness of advertising campaigns. The usage information is periodically reported to usage accounting 304 of ticker server 300. Moreover, the user may view a historical record of ticker items displayed and a history of interaction with the ticker by selecting an icon in the interactive ticker that serves a web page or otherwise provides a report with the historical ticker data to the user.

IV. Registration, Content Aggregation and Campaign Management

Figure 3:
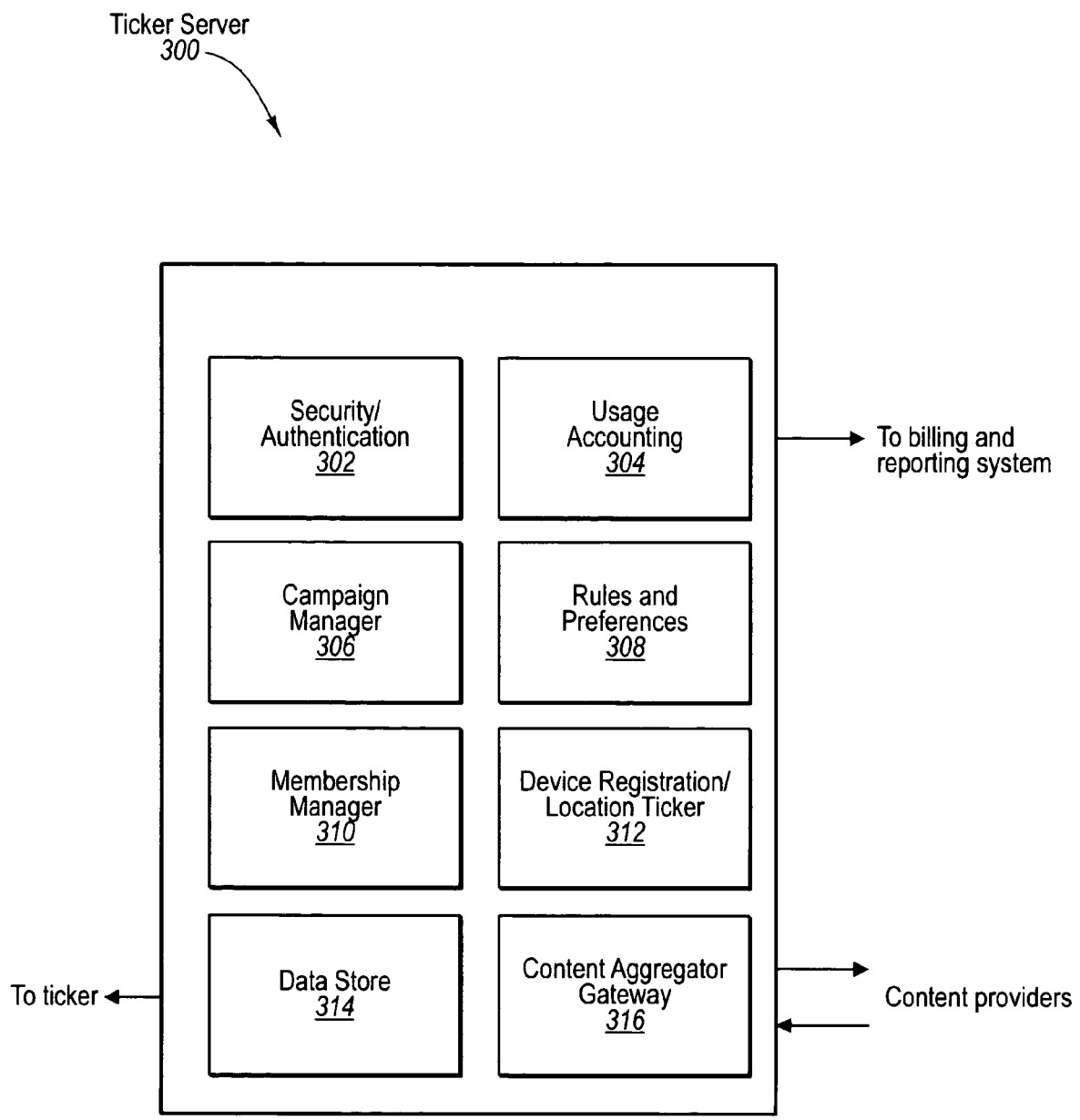
FIG. 3 is a schematic view of an exemplary implementation of a ticker server.

With reference now to FIG. 3, details are provided concerning an exemplary implementation of ticker server 300. In the exemplary embodiment, ticker server 300 operates in conjunction with a plurality of content providers and mobile communication devices 101. To gain access to the content offered by the plurality of content providers, ticker client software 200 resident on mobile communication device 101 registers with device registration and location tracker module 312 of ticker server 300. Using user interface elements of ticker client software 200, the user of mobile communication device 101 may further express rules and preferences concerning the type of content in which s/he is interested and the manner in which it should be displayed within the ticker on the device. Once expressed, the rules and preferences may be stored on mobile communication device 101 in rules and preferences module 210 for later use by the scheduling system, in rules and preferences module 308 of ticker server 300, or both. Along with specifying rules and preferences, a user of a landline communication device such as a PC or telephone may also indicate the geographical location of the device by completing an information profile during the registration process. Once initial registration is completed, ticker client software 200 may begin receiving content.

In the exemplary embodiment, ticker server 300 aggregates some content, but as previously noted, other content may be delivered via other means to ticker client software 200 on mobile communication device 101. Content providers may become members of the ticker service by registering with the service using membership manager 310. Once registered, content can be provided to the ticker server for distribution to registered mobile communication devices 101. In some cases, content providers can deliver content directly to the ticker client software, and in some situations the user may be prompted to accept or reject the content that is available for provision directly to the ticker client software.

With continuing attention to FIG. 3, content can be delivered to ticker server 300 in various ways. First, content providers, including large entertainment conglomerates such as MTV and Disney, as well as smaller, independent content providers, may feed content to the ticker server through content aggregator gateway 316 that provides a means for potentially disparate content servers to interface with ticker server 300. Content received via content aggregator gateway 316 may then be stored in data store 314. Alternatively, vendors of products and services may choose to input company and product information, as well as advertising and promotions into campaign manager 306 of ticker server 300. In another embodiment, a third party marketing campaign management system may interface with ticker server 300 to deliver content to data store 314. Campaign manager module 306 provides vendors and other content providers the capability to create and manage marketing campaigns for their products and services. Product and service information may be input via a web page and can include details such as the message to appear on the ticker, which customers should see which messages, product descriptions, competitive comparisons, promotional discounts and other information. Terms of use, pricing, promotion duration, and other marketing and advertising campaign details can be specified, implemented and updated using campaign manager 306. In some cases, the content can be encrypted before it is transmitted to the communication device. Decryption can be performed, for example, by transmitting a key to the mobile communication device at an appropriate time or location to enable the mobile communication device to decrypt content that it already has.

Once the encrypted content is downloaded to data store 208 of ticker client software 200 (reference FIG. 2), when the device arrives at the specified location and/or at the specified time, campaign manager 306 can initiate transmission of a key to the communication device to "unlock" the content such that it can be displayed within the ticker. Campaign manager 306 further provides capability for receiving feedback from usage accountant 222 of ticker client software 200 (see FIG. 2) and reporting on how many users have responded to vendor campaigns by interacting with the ticker. In any case, metadata, such as target user demographics and terms and conditions, may be provided along with the content provided to ticker server 300. For example, an automobile manufacturer may specify that its advertisement for a newly released vehicle be sent to communication devices within a certain proximity to a dealership to encourage the user to stop by to view the new vehicle. It may further specify the age of the recipient and also send a special promotional offer to users who are previous buyers from the manufacturer and whose lease agreements are close to expiring Security and authentication module 302 provides a variety of security services, including secure registration and authentication both for communication device users and for content providers, as well as monitoring the source of incoming content to ensure that only credible, registered users are interacting with the ticker server and that only authenticated content is delivered to the ticker client.

Usage accounting module 304 performs a variety of processes related to tracking the use of the content provided to ticker client software 200, including receiving usage data from usage accountant 222 (depicted in FIG. 2) of ticker client software 200 and exporting usage data to external billing, reporting, and campaign management systems.

Figure 4:
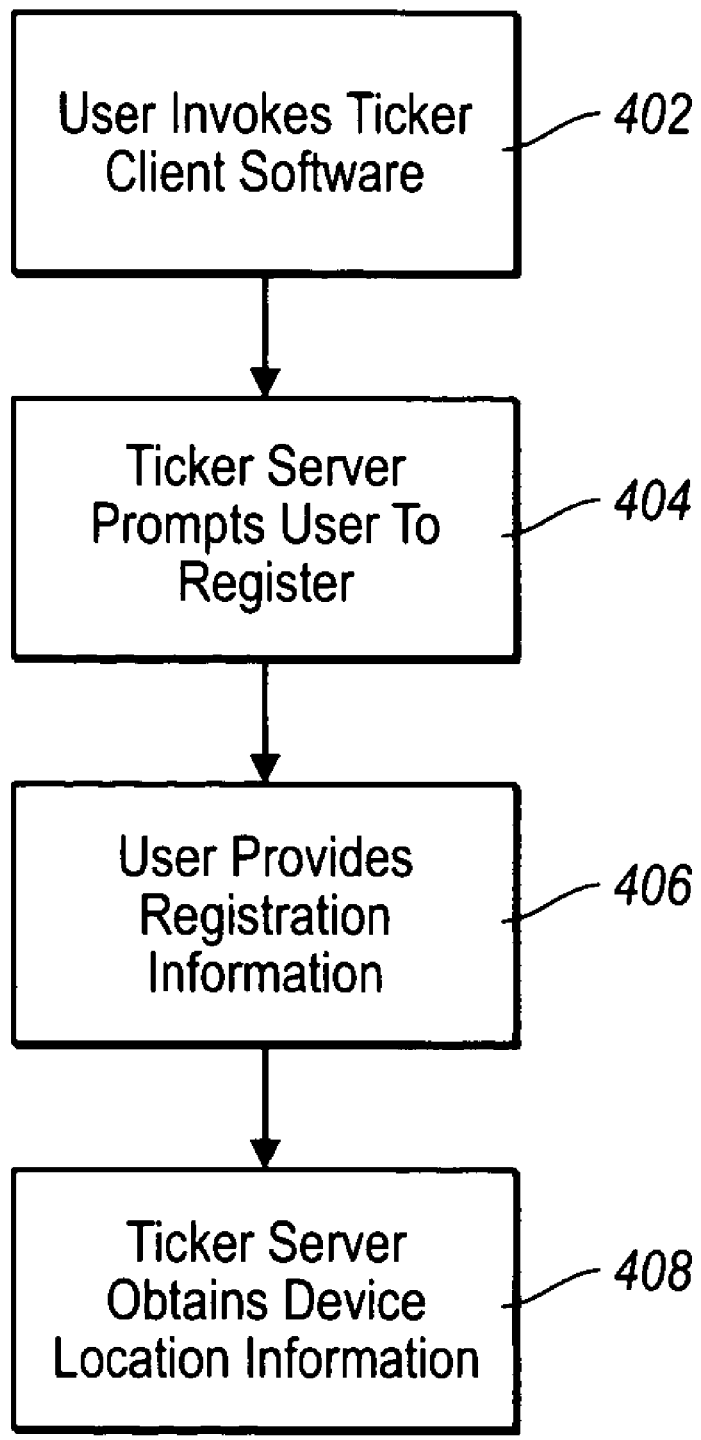
FIG. 4 is a flow chart illustrating aspects of a process for registration and location of a mobile communication device.

Turning now to FIG. 4, one embodiment of a process 400 is illustrated that is concerned with initial registration and location of mobile communication device 101. In operation, mobile communication device 101, which is configured with ticker client software 200, establishes a network connection in the conventional manner. At stage 402, ticker client software 200 is invoked in response to the user powering on mobile communication device 101 or by pressing a button, a soft key or issuing a verbal command to the device. At stage 404, the user is prompted by ticker server 300, which has established communication with ticker client software 200, to register with the ticker service. At stage 406, the user provides registration information, including billing address, device information, and content preferences, including ticker and content presentation attributes, and any other information requested by ticker server 300 in conjunction with ticker service registration requirements. Upon completion of stage 406, ticker client software 200 of mobile communication device is prepared to receive content. At stage 408, location tracker 312 of ticker server 300 (see FIG. 3) obtains location information for mobile communication device 101. In one case, mobile communication device 101 determines its location using any of the aforementioned positioning techniques known in the art and reports its location to location tracker 312. In other cases, location tracker 312 may query one or more network elements, such as a home location register (HLR), a visiting location register (VLR) or another element in the network to obtain location information for mobile communication device 101.

Figure 5:
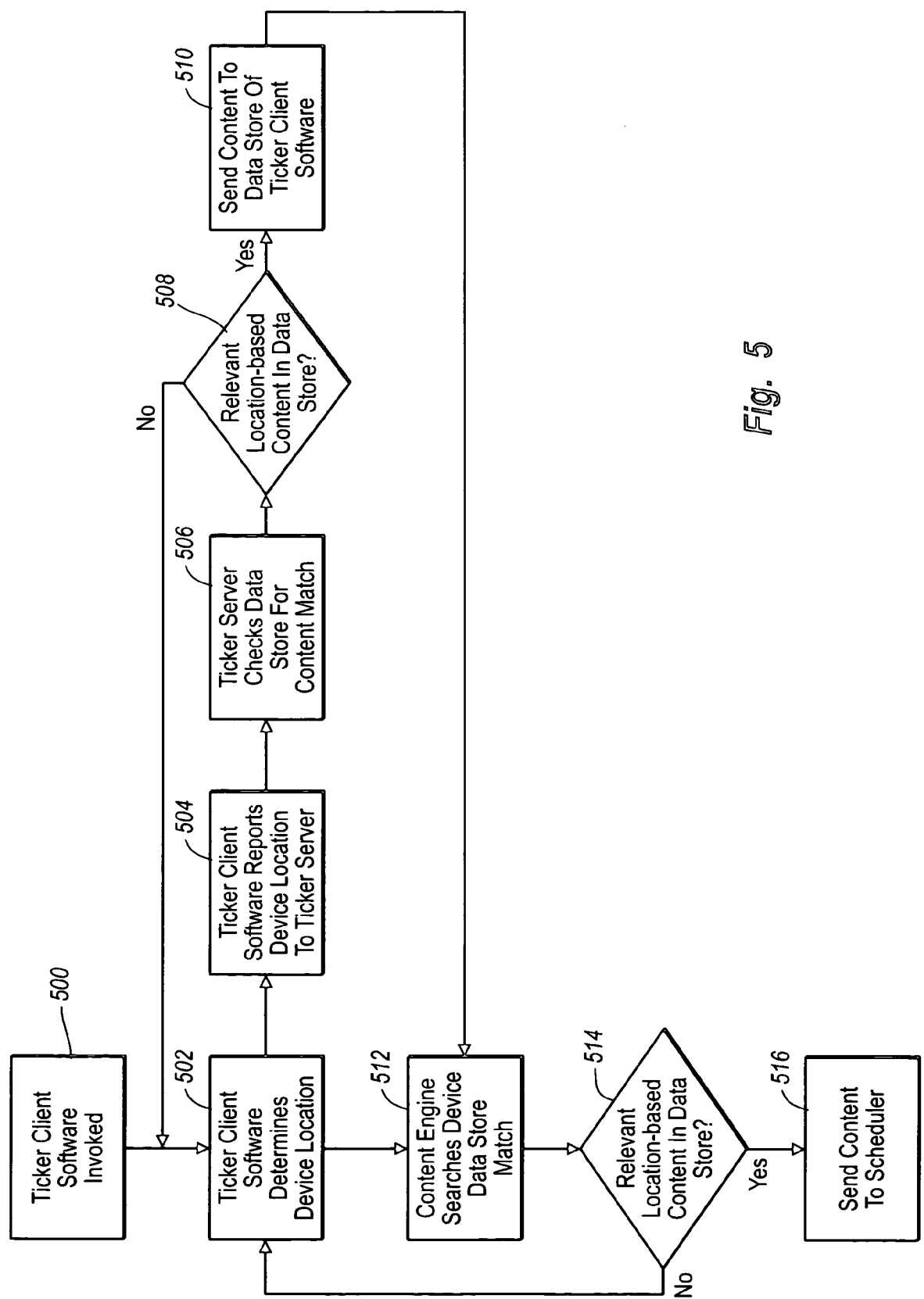
FIG. 5 is a flow chart illustrating a process for transmitting content to a communication device.

Turning attention now to FIG. 5, a process for providing location-based content from ticker server 300 to ticker client software 200 on mobile communication device 101 is illustrated. In one embodiment of the invention, location-based content can be selected for scheduling and display from local data store 208, from ticker server data store 314, or both. In operation, ticker client software is invoked at stage 500 either automatically by powering on mobile communication device 101, pressing a button or soft key on the device, or by a voice command. At stage 502 the ticker client software establishes its location. Once the geographical location of mobile communication device 101 is determined by ticker client software 200, the process can proceed along two different paths and the paths can be executed simultaneously. At stage 504 the ticker client reports its location to location tracker 312, of location-based ticker server 300, which causes a query to run at stage 506 against data store 314 to search for relevant location-based content. At stage 508 a decision is made as to whether there is a match between available content and the user's location and/or preferences. If a match is found, at stage 510 the content can be sent to data store 208 of ticker client software 200 using any of a number of transmission methods previously mentioned. In some cases, content that is low priority may be transmitted to ticker client software 200 at a time that is determined to be an off-peak time for network traffic, that is, the location-based ticker server has access to information about network loads such that it can determine peak and off-peak times with regard to traffic load and transmit the content accordingly based on its priority. Although not depicted, filter module 202, meta tagging module 204 and security module 206 may be employed to validate the source of the content and associate metadata with the content before it is stored in data store 208. Meanwhile, at stage 512, having established the location of the device, content engine 224 can query data store 208 of ticker client software 200 to search for relevant content already stored on the device pending display, and for newly received location-based content. The process continues at stage 514 where it is determined whether any of the content in data store 208 is a match for the user's current location and/or preferences. If it is determined that there is a match, the content is sent to scheduler 212 at stage 516 and prepared for display within the ticker.

Figure 6:
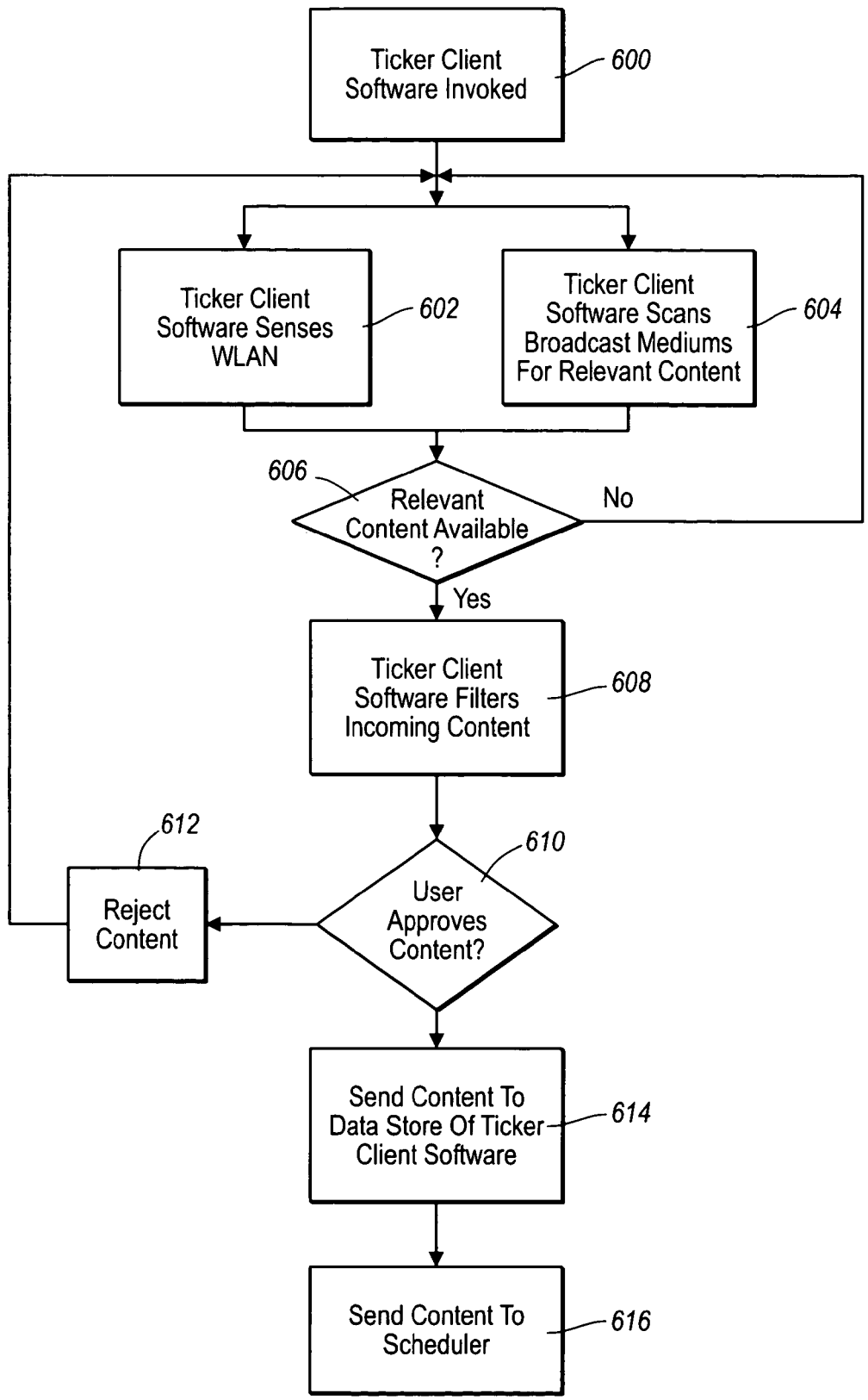
FIG. 6 is a flow chart illustrating a process for transmitting content to a communication device.

With reference now to FIG. 6, a process is illustrated for receiving content via a broadcast medium or from the wireless access point of an 802.11 or Bluetooth network. In one embodiment, invoking the ticker client software at stage 600 causes it to automatically attempt to detect a wireless access point. At the same time as it is attempting to detect wireless access points at stage 602, at stage 604 it can also monitor various types of broadcasts, such as FM or other terrestrial broadcasts or satellite radio broadcasts for relevant content. At stage 606, the ticker client software determines if any wireless access points are available from which to receive content. If wireless access points are available, they can begin sending content to the ticker client software. At stage 608, the ticker client software filters incoming content for relevancy and credibility. In one embodiment, the user can be prompted by security module 206 of ticker client software 200 to explicitly approve incoming content as depicted at stage 610, however this stage is not required and rules pertaining to approval of content can be specified by the user. In this case, if the user rejects the incoming content, the process returns to stage 602 and 604 wherein ticker client software "monitors" various broadcasts and continues to look for wireless access points. If the incoming content is accepted by the user at stage 610, the process continues to stage 614 in which the content is sent to the data store of the ticker client software. Although not depicted, meta tagging module 204 may assign metadata to the incoming content describing its attributes so it can be properly indexed in data store 208. The content is then sent to the scheduler and scheduled for display within the ticker.

V. Content Priority Scores

Figure 7:
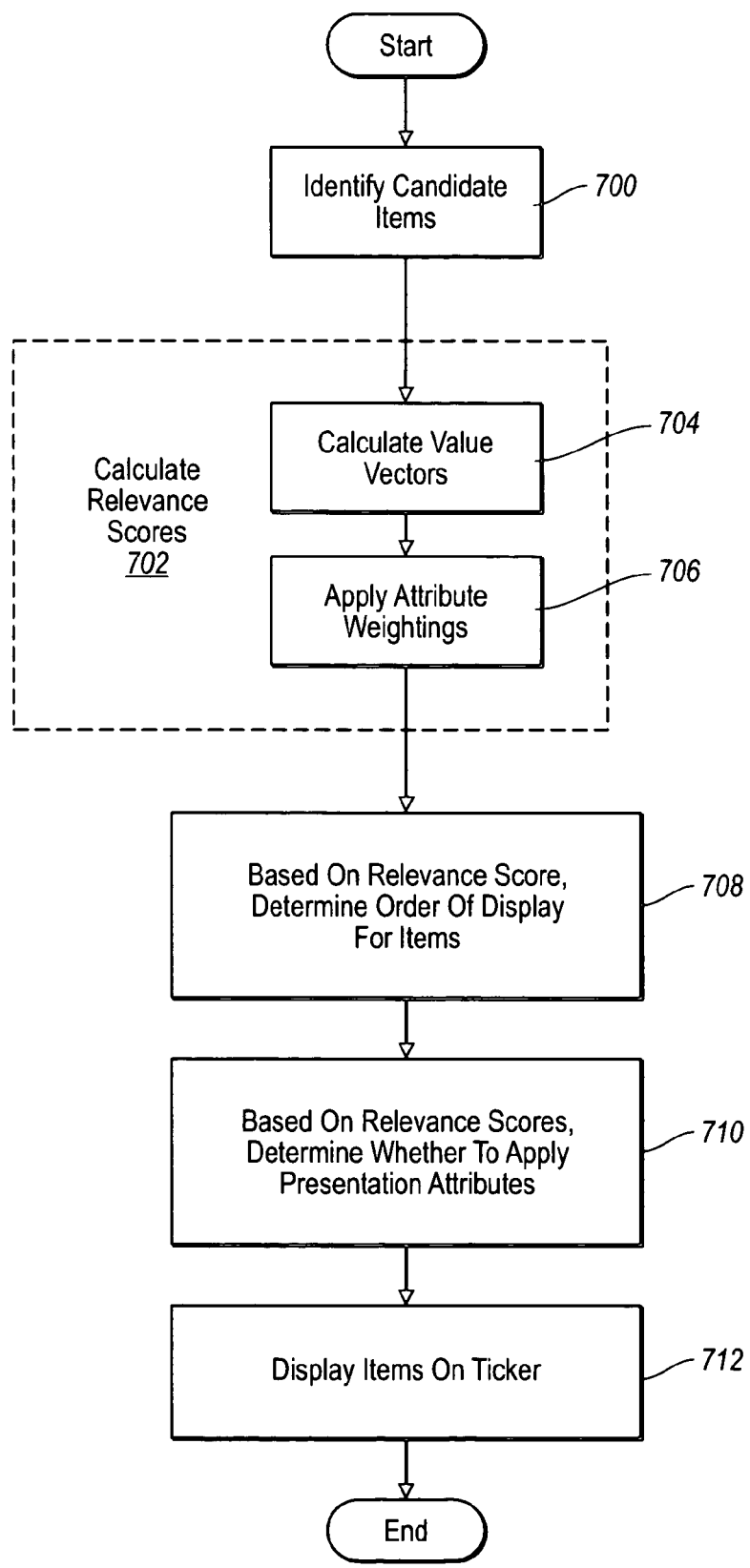
FIG. 7 is a flow chart illustrating aspects of a scoring algorithm for selecting and displaying content within a ticker on a display device.

With reference to FIG. 7, details are provided concerning the process of using one potential algorithm employed by scheduler 212 of ticker client software 200 (see FIG. 2) to determine the timing, order, or frequency with which content received into data store 208 is displayed within the ticker. Conditions such as strength of user preferences, time sensitivity of the content, degrees of relevance of the content, proximity to a location pertaining to the content, how often the content has been shown, content provider business arrangements, marketing campaign rules and other conditions are evaluated and a numerical value reflecting the priority of the location-based content is assigned to the content.

Content with the highest score is displayed within the ticker on mobile communication device 101 first, and if the score surpasses a certain priority threshold, presentation attributes, such as contrasting font colors or notifications may be applied to the displayed content.

For example, three items (advertisement for Peet's coffee, updated stock quote, and an ad for McDonalds) are identified as being candidates for display on the ticker at stage 700. The scoring system calculates a relevance score for each item at process 702 based on a number of system-defined attributes; in this case proximity, user preferences (our user loves coffee and follows the stock market), and the advertising rate paid by the advertiser are the attributes considered in the calculation. The process 702 of calculating the relevance score includes calculating a value vector for each of these three attributes for each item in stage 704. Using a scale from 0 to 100 as an example, the score for Peet's might be (50, 100, 50) since the user is a few blocks from the coffee shop, has specified a strong preference for Peet's. brand coffee, and the advertising fee being paid by Peet's is in the middle of the range of advertising fees paid. For the stock quote, the value vector might be (0, 100, 0), since proximity does not apply and no advertising fee is being paid, and for the McDonalds ad the value vector is (0, 0, 75) since the user is not near a McDonalds, nor has the user expressed a preference for McDonalds, but McDonalds is paying a very high advertising rate to promote their new product in the ticker display.

Given these three value vectors, an attribute weighting is then applied in stage 706 of the process 702 of calculating the relevance scores. In this example, proximity is most important and has a weight of 100, user preferences are the next most heavily weighted attribute with a weight of 80, and the advertising fees paid are assigned a weight of 50. A score can now be calculated for each of these items, which will determine the order in which the items are displayed in the ticker according to stage 708. In addition, the relevance scores can be used to determine in stage 710 whether to apply presentation attributes to the items when they are displayed on the ticker in stage 712. The calculations for these items in this example are as follows:

Peet's: 50*100+100*80+50*50=15500;

Stock quote: 0*100+100*80+0*50=8000;

McDonalds: 0*100+0*80+75*50=3750.

Thus, in this example, the Peet's item would be displayed first, the stock quote second, and McDonald's last. These scores can also be used to determine how often to show content. In this example, the device might show the Peet's coffee item twice as often as the stock quote, and four times as often as the McDonald's item. Of course other scoring systems and scheduling systems could be used, and the specific parameters can be highly customized for the particular application.

VI. Telecommunication Devices and Computing Environments

Embodiments of the present invention may be implemented in connection with a special purpose or general purpose telecommunications device, including wireless telephones and other telephony-enabled mobile devices, landline telephones, or special purpose or general purpose computers that are adapted to have telecommunications or data networking capabilities such as cable set top boxes or PCs. Embodiments within the scope of the present invention also include computer-readable media for carrying or having computer-executable instructions or electronic content structures stored thereon, and these terms are defined to extend to any such media or instructions that are used with telecommunications devices.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. In a communication network that includes a ticker server and communication devices having display devices on which tickers can be rendered, a method for determining how to display content on the tickers, comprising:

identifying at least two content items, including a first content item and a second content item, that are available to be displayed on a ticker of a communication device, wherein the at least two content items are identified based on attributes including (1) a geographic location of the communication device and (2) a geographic location associated with each of the at least two content items;

at the communication device, assigning a first score to the first content item and a second score to the second content item, the first score and the second score being based on at least a proximity of the communication device to locations pertaining to the at least two content items, the proximity being determined from the geographic location of the communication device and the geographic location associated with each of the at least two content items, wherein a manner of displaying at least one of the first content item and the second content item is specified by the first score and second score;

using a scheduling system of the communication device, scheduling display of the first content item and the second content item based on the first score and the second score; and displaying at least one of the first content item and the second content item in the ticker of the communication device.

2. The method as recited in claim 1, wherein the manner of displaying specified by the first score and the second score comprises the order in which the first content item and the second content item are displayed.

3. The method as recited in claim 1, wherein the manner of displaying specified by the first score and the second score comprises the timing by which the first content item and the second content item are displayed.

4. The method as recited in claim 1, wherein the manner of displaying specified by the first score and the second score comprises the relative frequency by which the first content item and the second content item are displayed.

5. The method as recited in claim 1, wherein assigning the first score and the second score comprises accessing display rules contained in metadata associated with the first content item and the second content item.

6. The method as recited in claim 1, wherein assigning the first score and the second score comprises evaluating at least one attribute selected from the group of attributes consisting of:
the strength of user preferences;
time sensitivity of the content items;
degrees of relevance of the content items;
how often the content items have previously been displayed on the interactive ticker;
content provider business arrangements; and
marketing campaign rules.

7. The method as recited in claim 6, wherein:
evaluating at least one attribute comprises assigning a first value associated with the at least one attribute for the first content item and assigning a second value associated with the at least one attribute for the second content item; and
assigning the first score and the second score further comprise:
for the first content item, applying a first attribute weighting to the first value; and
for the second content item, applying a second attribute weighting to the second value, thereby obtaining the first score and the second score.

8. The method as recited in claim 1, further comprising, using a usage account, tracking how often a particular content item is displayed using a usage account.

9. The method as recited in claim 8, further comprising, using a usage account, tracking how often the particular content item is accessed by a user.

10. The method as recited in claim 1, wherein the communication device comprises a mobile communication device.

11. The method as recited in claim 1, wherein the communication device comprises a set top box.

12. The method as recited in claim 1, further comprising:
receiving user input selecting at least one of the first content item and the second content item; and
performing a secondary item in response to receiving the user input.

13. The method as recited in claim 1, wherein the first content item and the second content item are location-based content items that are selected in response to a location of the communication device.

14. In a communication network that includes a ticker server and communication devices having display devices on which tickers can be rendered, a method for determining how to display content on the tickers, comprising:
identifying a first content item based on attributes including a geographic location of the communication device and a geographic location associated with the first content item;
assigning a score to the first content item based on at least a proximity of the communication device to the location pertaining to the first content item, wherein a manner of displaying the first content item in relation to one or more other content items is specified by the score of the first content item;
using a scheduling system of the communication device, scheduling display of the first content item based on the score of the first content item; and
displaying the first content item in the ticker of the communication device as specified by the scheduling system.

15. The method as recited in claim 14, wherein the manner of displaying the first content item in relation to one or more other content items comprises at least one of:
the order in which the first content item is displayed relative to one or more other content items;
the timing by which the first content item is displayed; or
the relative frequency at which the first content item is displayed.

16. In a communication network that includes a ticker server and communication devices having display devices on which tickers can be rendered, a method for determining how to display content on the tickers, comprising:
identifying a first content item and a second content item that are available to be displayed on a ticker of a communication device, wherein the first content item and the second content item are identified based on one or more attributes;
using a scheduling system of the communication device, determining how and when to display the first content item and the second content item by assigning a first score to the first content item and a second score to the second content item, comprising:
identifying a first attribute associated with the first content item based on a proximity of the communication device to a location pertaining to the first content item, assigning a first attribute value for the first content item, and applying a first attribute weighting to the first attribute value associated with the first content item to obtain the first score; and
identifying the first attribute associated with the second content item based on a proximity of the communication device to a location pertaining to the second content item, assigning a second attribute value for the second content item, and applying the first attribute weighting to the second attribute value associated with the second content item to obtain the second score; and
displaying at least one of the first content item and the second content item in the ticker of the communication device according to the first score and the second score.

17. The method as recited in claim 16, wherein assigning a first attribute value for the first content item comprises scaling the first attribute value and assigning a second attribute value for the second content item comprises scaling the second attribute value.

18. The method as recited in claim 16, wherein assigning a first score to the first content item and a second score to the second content item further comprises:

identifying a second attribute associated with the first content item, identifying a second attribute value for the first content item, applying a second attribute weighting to the second attribute value associated with the first content item for the first score; and identifying the second attribute associated with the second content item, identifying a second attribute value for the second content item, applying the second attribute weighting to the second attribute value associated with the second content item for the second score.

* * * * *